(12) United States Patent
Si et al.

(10) Patent No.: US 12,744,439 B2
(45) Date of Patent: Sep. 22, 2026

(54) VIBRATION MOTOR WITH WIRES WITH MAGNETIC CONDUCTOR

(71) Applicant: AAC Microtech (Changzhou) Co., Ltd., Changzhou (CN)

(72) Inventors: Xiujiang Si, Changzhou (CN); Ronglin Linghu, Changzhou (CN); Bo Xiao, Changzhou (CN); Peng Cai, Changzhou (CN)

(73) Assignee: AAG Microtech (Changzhou) Co., Ld., Changzhou (CN)

( * ) Notice: Subject to any disclaimer, the term of this patent is extended or adjusted under 35 U.S.C. 154(b) by 221 days.

(21) Appl. No.: 18/395,779

(22) Filed: Dec. 26, 2023

(65) Prior Publication Data

US 2025/0132654 A1 Apr. 24, 2025

Related U.S. Application Data

(63) Continuation of application No. PCT/CN2023/125409, filed on Oct. 19, 2023.

(51) Int. Cl.
*H02K 33/02* (2006.01)
*H02K 1/02* (2006.01)
(Continued)

(52) U.S. Cl.
CPC ............... *H02K 33/02* (2013.01); *H02K 1/02* (2013.01); *H02K 1/04* (2013.01); *H02K 33/16* (2013.01)

(58) Field of Classification Search
CPC ............ H02K 1/02; H02K 1/04; H02K 33/02; H02K 33/16
See application file for complete search history.

(56) References Cited

U.S. PATENT DOCUMENTS 5,594,805 A * 1/1997 Sakamoto .............. H04R 9/046 381/432
2017/0272865 A1* 9/2017 Zhao ...................... H04R 9/046
(Continued)

FOREIGN PATENT DOCUMENTS

CN 113162358 A * 7/2021 ............... H02K 1/34

OTHER PUBLICATIONS

Liu (CN 113162358 A) English Translation (Year: 2021).*

*Primary Examiner* — Tulsidas C Patel
*Assistant Examiner* — Robert E Mates
(74) *Attorney, Agent, or Firm* — Wiersch Law Group

(57) ABSTRACT

The present application provides a vibration motor including a casing having an accommodating space, and a stator assembly and a vibrator assembly accommodated in the accommodating space. One of the stator assembly and the vibrator assembly includes a magnetic steel, and the other includes a coil arranged in correspondence with the magnetic steel. The coil interacts with the magnetic steel to provide a driving force for the vibrator assembly. The coil is wound from wires, and the vibration motor further includes a magnetic conductor arranged in a magnetic field of the magnet steel. The magnetic conductor is made of a magnet-conducting material, and arranged within or between the wires. As the magnet-conducting material is magnetized in the magnetic field, the strength of the magnetic field is increased, which results in a greater driving force generated by the coil, thereby greatly improving the vibration performance of the vibration motor.

7 Claims, 8 Drawing Sheets

(51) Int. Cl.
*H02K 1/04* (2006.01)
*H02K 33/16* (2006.01)

(56) References Cited

U.S. PATENT DOCUMENTS

| | | | | |
|---|---|---|---|---|
| 2017/0280248 | A1* | 9/2017 | Kuze | H04R 9/025 |
| 2020/0381153 | A1* | 12/2020 | Brown | H02K 3/04 |
| 2021/0211030 | A1* | 7/2021 | Li | H02K 33/18 |

* cited by examiner

VIBRATION MOTOR WITH WIRES WITH MAGNETIC CONDUCTOR

CROSS-REFERENCE TO RELATED APPLICATIONS

This application is a continuation of International Application No. PCT/CN2023/125409, filed on Oct. 19, 2023, the entire contents of which are incorporated herein by reference.

TECHNICAL FIELD

The present application relates to the technical field of vibration motors, in particular to a vibration motor.

BACKGROUND

For devices that utilize an energized coil subjected to an electromagnetic force in a magnetic field to generate vibration (e.g., a vibration motor in the mobile phone), the stronger the magnetic field around the energized coil, the greater the driving force that will be generated.

In the related art, the vibration motor includes a magnetic steel and a coil. The magnetic steel is configured to provide a stable magnetic field and the coil vibrates by generating a driving force in the magnetic field provided by the magnet. However, the small internal space of the vibration motor makes the size of the magnetic steel smaller and the magnetic field strength generated by the magnetic steel lower, which in turn makes the driving force generated when the coil is energized smaller, resulting in a weaker vibration sensation of the vibration motor.

Therefore, it is necessary to provide a new vibration motor to solve the above defects.

SUMMARY

An object of the present application is to provide a vibration motor that can solve the technical problem in the related art of the vibration motor in which the driving force generated when the coil is energized is small due to the low strength of the magnetic field generated by the magnet.

The technical solution of the present application is as follows.

A vibration motor, comprising:

a casing having an accommodating space; and a stator assembly and a vibrator assembly accommodated in the accommodating space;

wherein one of the stator assembly and the vibrator assembly comprises a magnetic steel, and the other comprises a coil arranged in correspondence with the magnetic steel; wherein the coil interacts with the magnetic steel to provide a driving force for the vibrator assembly, and the coil is wound from wires; wherein the vibration motor further comprises a magnetic conductor arranged in a magnetic field of the magnetic steel; the magnetic conductor is made of magnet-conducting material, and the magnetic conductor is arranged within or between the wires.

In one embodiment, the magnetic conductor is provided within the wires; each of the wires comprises an electric conductor and an insulating layer wrapped around an outer side of the electric conductor, wherein the insulating layer is also wrapped around an outer side of the magnetic conductor.

In one embodiment, the magnetic conductor is a shaft core of the electric conductor, and the electric conductor is wrapped around the outer side of the magnetic conductor.

In one embodiment, the magnetic conductor is provided between the electric conductor and the insulating layer, the magnetic conductor wrapped around an outer side of the electric conductor, and the insulating layer is wrapped around the outer side of the magnetic conductor.

In one embodiment, the coil comprises a plurality of layers of wires stacked in a thickness direction of the coil, and the magnetic conductor is provided between two adjacent layers of the wires.

In one embodiment, a volume of the magnetic conductor accounts for 1% to 95% of a volume of the coil.

In one embodiment, the magnet-conducting material comprises at least one of pure iron, mild steel, an iron-nickel alloy, an iron-cobalt alloy, copper, and aluminum.

In one embodiment, the vibrator assembly further comprises an iron core supporting the coil, and the wires are wrapped around the iron core to form the coil.

The beneficial effect of the present application is that since the magnet-conducting material is magnetized in the magnetic field provided by the magnet steel, the magnetic field strength around the coil is increased, which will result in a greater driving force generated by the coil, thereby further improving the performance of the vibration motor.

Figure 1:
FIG. 1 shows an exploded view of a vibrator assembly without an iron core in a vibration motor according to an embodiment of the present application.
Figure 1:
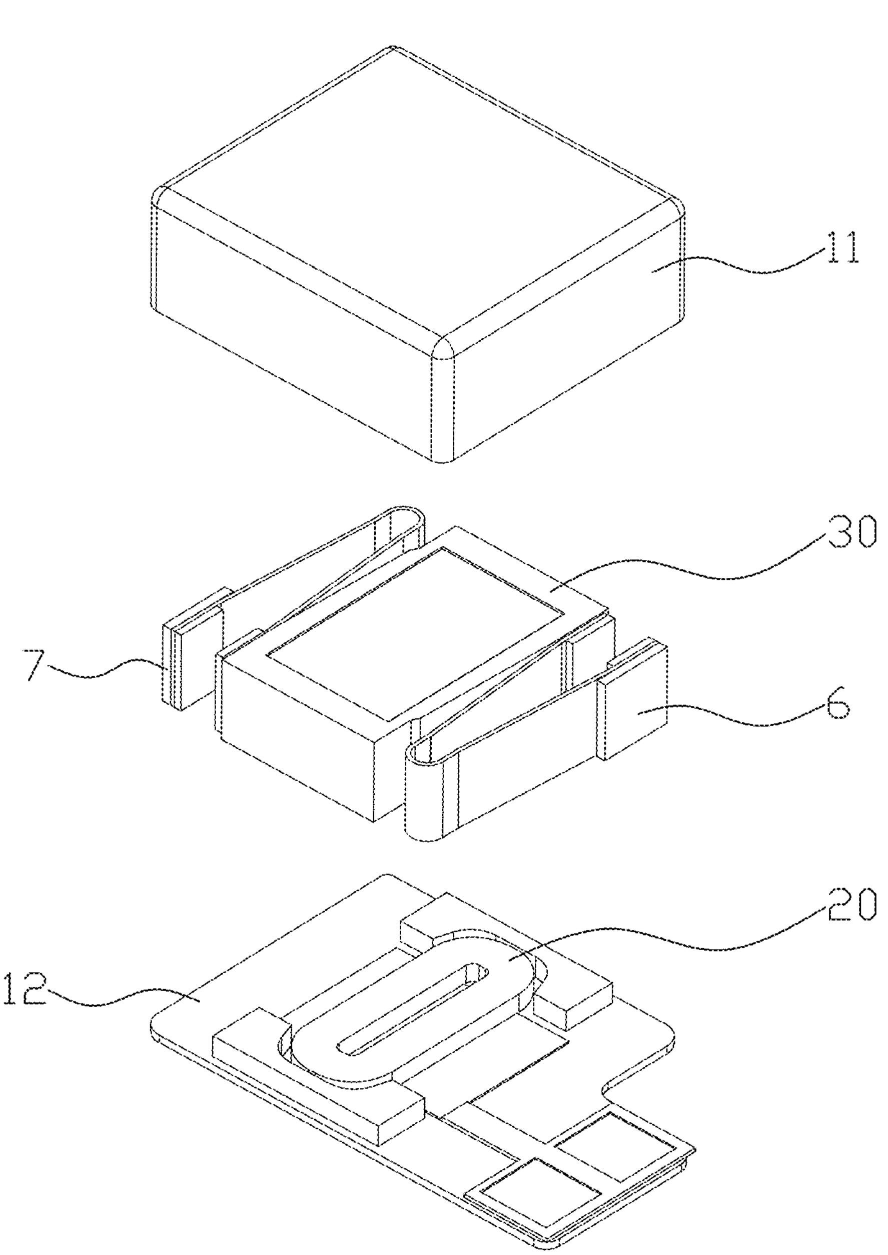

The realization of the objects, functional features, and advantages of the present application will be further described in conjunction with the embodiments and with reference to the accompanying drawings.

DETAILED DESCRIPTION OF THE EMBODIMENTS

The present application is further described below in conjunction with the accompanying drawings and embodiments.

As shown in FIGS. 1-6, an embodiment of the present application provides a vibration motor 100, including a casing 1 having an accommodating space, a stator assembly 20 and a vibrator assembly 30 accommodated in the accommodating space. One of the stator assembly 20 and the vibrator assembly 30 includes a magnetic steel 2, and the other includes a coil 3 arranged in correspondence with the magnetic steel 2. The coil 3 interacts with the magnetic steel 2 to provide a driving force for the vibrator assembly 30. In this embodiment, the stator assembly 20 includes a magnetic steel 2 fixed to the casing 1. The vibrator assembly 30 includes a coil 3 elastically connected to the casing 1. The coil 3 generates a driving force and vibrates in a magnetic field provided by the magnetic steel 2 when it is energized. The coil 3 is wound from the wires 31. The vibration motor 100 further includes a magnetic conductor 5 fixed to the coil 3. The magnetic conductor 5 is made of a magnet-conducting material, and the magnetic conductor 5 is provided within or between the wires 31.

As the magnet-conducting material is magnetized in the magnetic field provided by the magnetic steel 2, the strength of the magnetic field around the coil 3 is increased, which results in a greater driving force generated when the coil 3 is energized, thereby greatly increasing the performance (e.g., response speed, vibration sensation, etc.) of the vibration motor.

It is to be noted that in other embodiments, the vibrator assembly 30 includes a magnetic steel 2 fixed to the casing 1, and the stator assembly 20 includes a coil 3 elastically connected to the casing 1.

The magnet-conducting material includes at least one of pure iron, mild steel, iron-nickel alloy, iron-cobalt alloy, copper, and aluminum. That is, the magnet-conducting material may be either a soft magnetic material or a conductive material, such that the magnetic conductor 5 may be involved in conducting electricity. For example, the magnet-conducting material may be any one of pure iron, mild steel, iron-nickel alloy, iron-cobalt alloy, copper and aluminum, or an iron-nickel-cobalt alloy, a copper-aluminum alloy, an iron-nickel-copper alloy, or the like.

As shown in FIG. 1, in some embodiments, the vibration motor 100 further includes a first elastic support 6 and a second elastic support 7 accommodated in the accommodating space and connected to two ends of the casing 1, respectively, and the two ends of the coil 3 are connected to the first elastic support 6 and the second elastic support 7, respectively, so as to enable the coil 3 to be vibrated from side to side. The casing 1 includes an upper casing 11 with an accommodating space and a bottom cover 12 fixed to one end of the upper casing 11 and covering the accommodating space. The magnetic steel 2 is fixed to the bottom cover 12.

Figure 5:
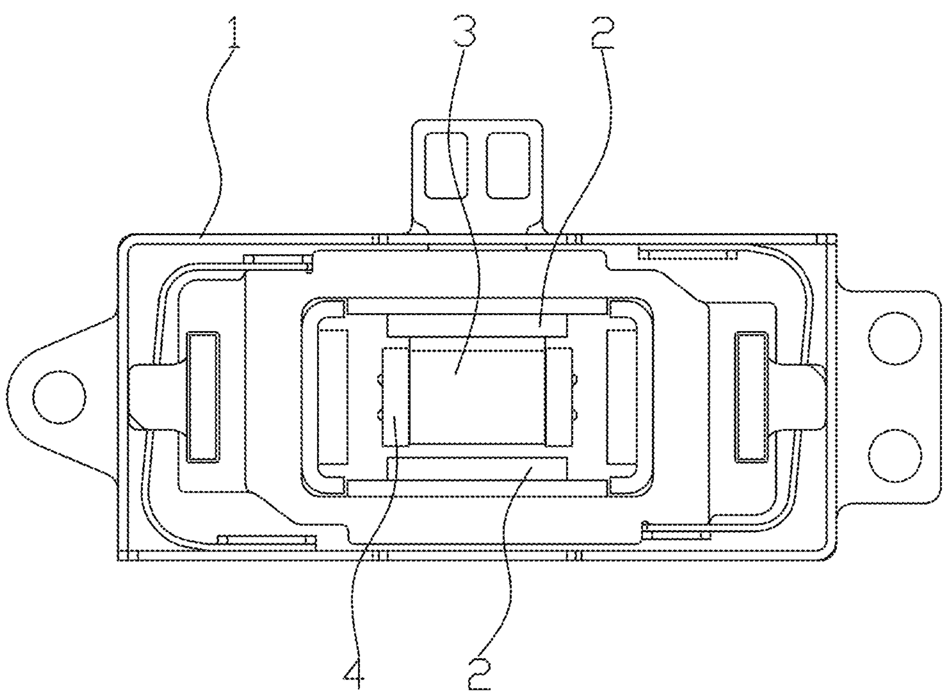
FIG. 5 shows a top view of the vibrator assembly including an iron core in the vibration motor according to an embodiment of the present application.
Figure 6:
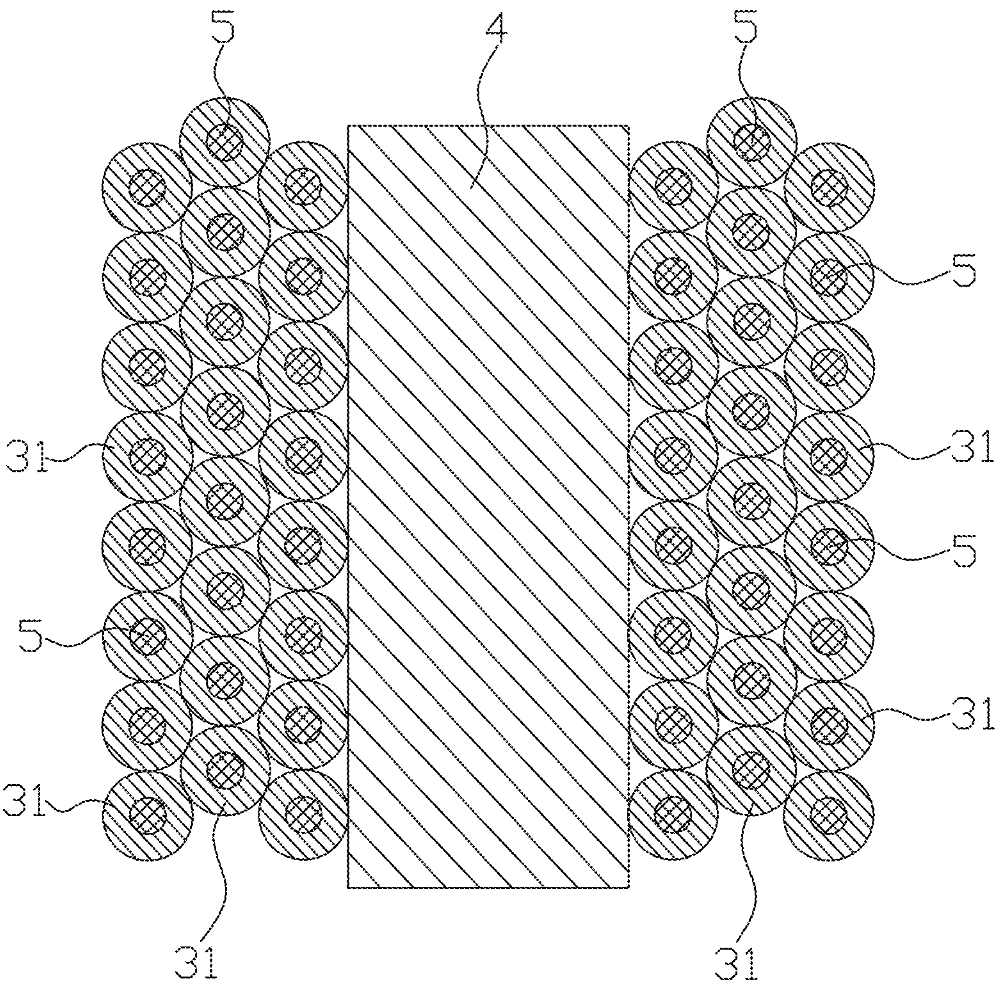
FIG. 6 shows a cross-sectional view of the magnetic conductor provided within the wires in the vibration motor according to an embodiment of the present application.

As shown in FIG. 5, in some embodiments, the vibrator assembly 30 further includes an iron core 4 elastically connected to the casing 1 at each end. The coil 3 is fixedly sleeved on the outer side of the iron core 4, i.e., the wires 31 are wrapped around the iron core 4 to form the coil 3. There are two magnetic steels 2, and the coil 3 is provided between the two magnetic steels 2.

Figure 2:
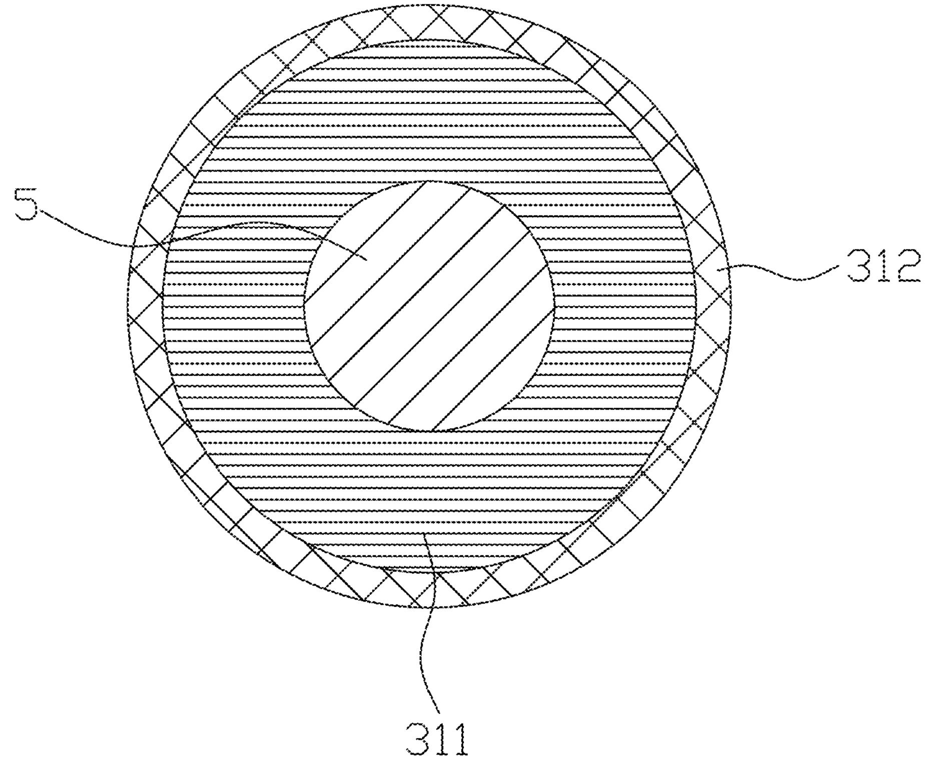
FIG. 2 is a cross-sectional view of an electric conductor wrapped around an outer side of a magnetic conductor in the vibration motor according to an embodiment of the present application.
Figure 3:
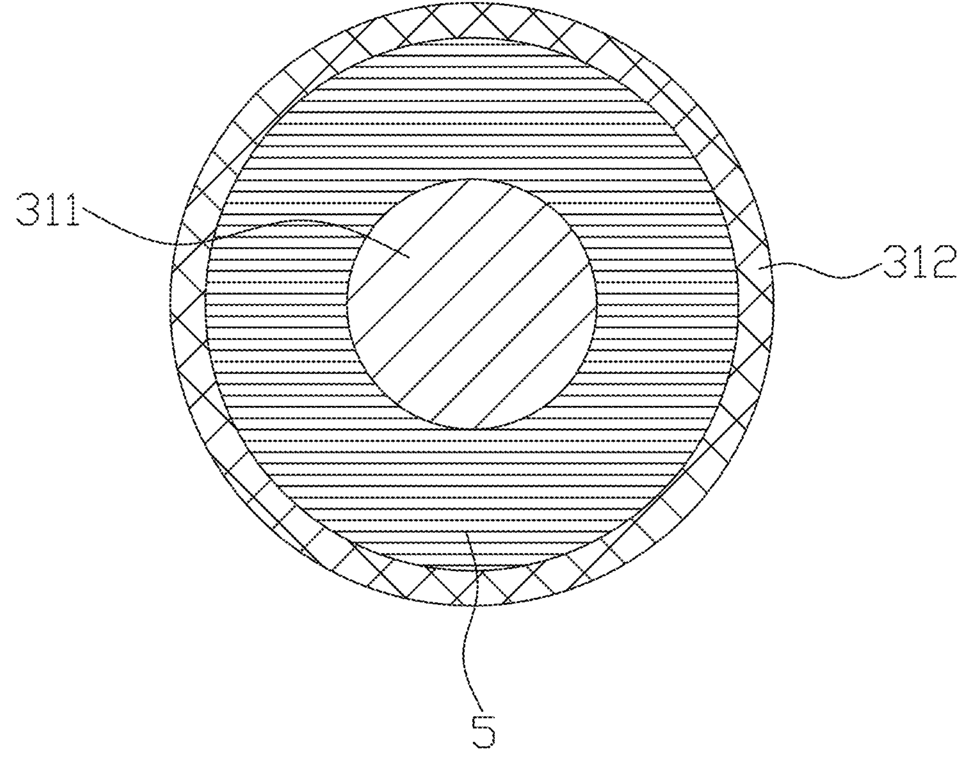
FIG. 3 shows a cross-sectional view of the magnetic conductor wrapped around an outer side of the electric conductor in the vibration motor according to an embodiment of the present application.

As shown in FIGS. 2 and 3, the magnetic conductor 5 is provided within the wires 31. Each wire 31 includes an electric conductor 311 and an insulating layer 312 wrapped around the outer side of the electric conductor 311. The insulating layer 312 is further wrapped around the outer side of the magnetic conductor 5. The magnetic conductor 5 is arranged within the electric conductor 311, or the magnetic conductor 5 is arranged between the electric conductor 311 and the insulating layer 312 so as to form the magnetic conductor 5 within the wires 31. Since the magnetic conductor 5 is provided within the wires 31, it will not interfere with the subsequent winding of the wires 31, thereby facilitating the molding of the coil 3.

As shown in FIG. 2, the magnetic conductor 5 is provided within the electric conductor 311, and the magnetic conductor 5 is a shaft core of the electric conductor 311. The electric conductor 311 is wrapped around the outer side of the magnetic conductor 5, thereby avoiding enlarging the diameter of the wires 31 due to the provision of the magnetic conductor 5. Specifically, the fixing between the magnetic conductor 5 and the electric conductor 311 may be by casting molding in one piece, or a mounting hole (not shown) may be provided in the electric conductor 311, and the magnetic conductor 5 is mounted in the mounting hole. The magnetic conductor 5 is electrically connected to the electric conductor 311, i.e., the magnetic conductor 5 is involved in conducting electricity. For example, the magnetic conductor 5 may be a mild steel, an iron-nickel alloy, an iron-cobalt alloy, and the like. According to practical requirements, the magnetic conductor 5 may be provided at any position within the electric conductor 311, such as a region to the left of the center of the electric conductor 311, or a region to the top of the center of the electric conductor 311.

As shown in FIG. 3, the magnetic conductor 5 is provided between the electric conductor 311 and the insulating layer 312. The magnetic conductor 5 is wrapped around the outer side of the electric conductor 311, and the insulating layer 312 is wrapped around the outer side of the magnetic conductor 5. Specifically, the fixing between the magnetic conductor 5 and the electric conductor 311 may be by casting molding in one piece, or a mounting hole (not shown) may be provided in the magnetic conductor 5, and the electric conductor 311 is mounted in the mounting hole. The magnet-conducting material may be pure iron, mild steel, iron-nickel alloy, aluminum, etc., i.e., the magnetic conductor 5 is electrically connected to the electric conductor 311.

It is to be noted that when the magnetic conductor 5 is provided within the wires 31, the magnetic conductor 5 may also be arranged within the insulating layer 312, and the magnetic conductor 5 is not in contact with the electrical conductor 311. That is, the magnetic conductor 5 and the electrical conductor 311 are electrically insulated, and the magnetic conductor 5 does not participate in electrical conductivity. The magnetic conductor 5 is in the form of particles, which can be achieved by adding the magnetic conductor material to the molten state of the insulating material in the molding process of the insulating layer 312, thereby realizing that the magnetic conductor 5 is provided within the insulating layer 312.

Figure 4:
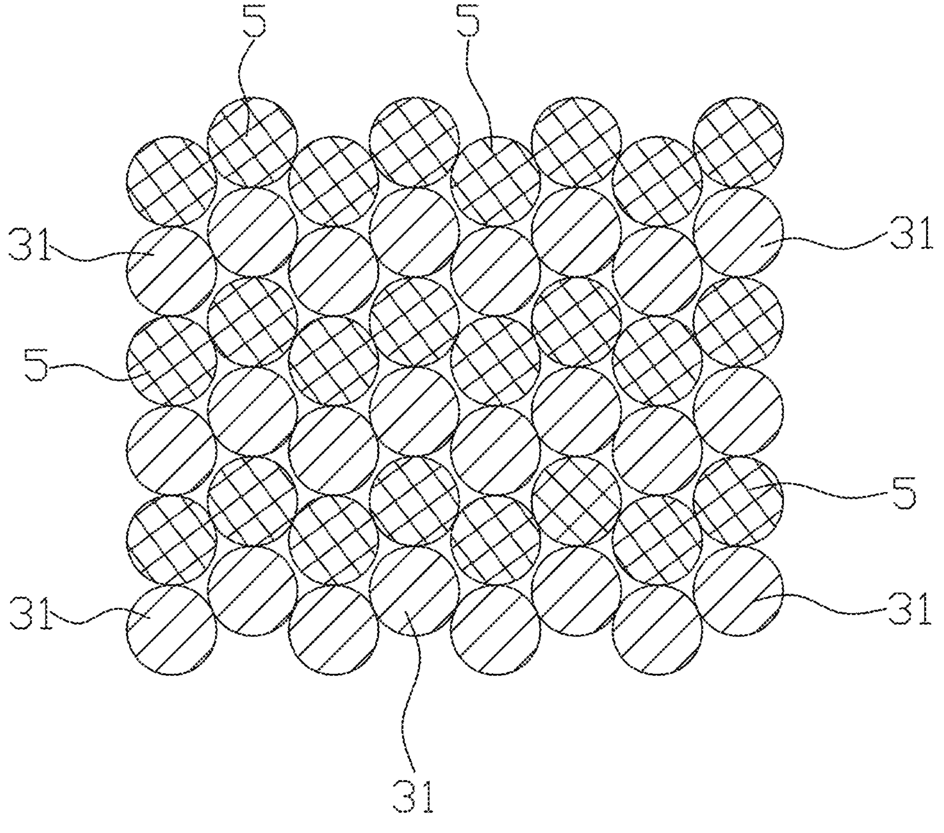
FIG. 4 shows a cross-sectional view of the magnetic conductor provided between wires in the vibration motor according to an embodiment of the present application.

As shown in FIG. 4, in some embodiments, the coil 3 includes a plurality of wires 31 stacked in a thickness direction of the coil 3. The magnetic conductor 5 is provided between two adjacent layers of the wires 31, so that the magnetic conductor 5 is provided between the respective wires 31, making it simpler for the magnetic conductor 5 to be set up in a manner on the coil 3. The magnetic conductor 5 is not in contact with the electric conductor 311, and the magnetic conductor 5 is not involved in the conductivity. The magnetic conductor 5 may be fixed by extrusion between two adjacent turns of the wires 31 of the coil 3, or it may be fixed by adhesive bonding. Specifically, when the magnetic conductor 5 is fixed by extrusion between two adjacent turns of wires 31 of the coil 3, the magnetic conductor 5 may be in the form of a column, and the magnetic conductor 5 may also be provided in the innermost layer of the coil 3 when the coil 3 is sleeved on the iron core 4. When the magnetic conductor 5 is fixed by bonding, the magnetic conductor 5 may be in the form of particles, and the magnetic conductor 5 may be fixed by bonding to both the innermost and outermost layers of the coil 3.

In some embodiments, the volume of the magnetic conductor 5 accounts for 1% to 95% of the volume of the coil 3, such as 1%, 10%, 30%, 45%, 80%, and 95%.

In the following embodiments, the vibration motor 100 with the coil 3 fixed with the magnetic conductor 5 and the vibration motor 100 with the coil 3 not provided with the magnetic conductor 5 are analyzed:

Embodiment 1

In this embodiment, as shown in FIG. 1, the coil 3 is arranged on one side of the magnetic steel 2. For example, the magnetic steel 2 is arranged below the coil 3, and the magnetic steel 2 is a permanent magnetic steel to provide a stable magnetic field. The coil 3 generates a driving force to vibrate in the magnetic field provided by the magnetic steel 2 when the coil 3 is energized.

Specifically, for the vibration motor 100 with the coil 3 fixed with the magnetic conductor 5, the magnitude of the driving force generated when the coil 3 is energized is 0.426 N. For the vibration motor 100 with the coil 3 not provided with the magnetic conductor 5, the magnitude of the driving force generated when the coil 3 is energized is 0.3 N. That is, the vibration motor 100 has a 42% increase in the magnitude of the driving force when the coil 3 of the vibration motor 100 is fixed with the magnetic conductor 5 compared to the coil 3 not provided with the magnetic conductor 5.

Embodiment 2

In this embodiment, as shown in FIG. 5, the coil 3 is provided between two magnetic steels 2, both of which are permanent magnets and jointly provide a stable magnetic field, and the coil 3 generates a driving force to vibrate in the magnetic field jointly provided by the two magnetic steels 2 when energized.

Specifically, for the vibration motor 100 with the coil 3 fixed with the magnetic conductor 5, the magnitude of the driving force generated when the coil 3 is energized is 1.1175 N. For the vibration motor 100 with the coil 3 not provided with the magnetic conductor 5, the magnitude of the driving force generated when the coil 3 is energized is 0.75 N. That is, the vibration motor 100 has a 49% increase in the magnitude of the driving force when the coil 3 of the vibration motor 100 is fixed with the magnetic conductor 5 compared to the coil 3 not provided with the magnetic conductor 5.

Figure 7:
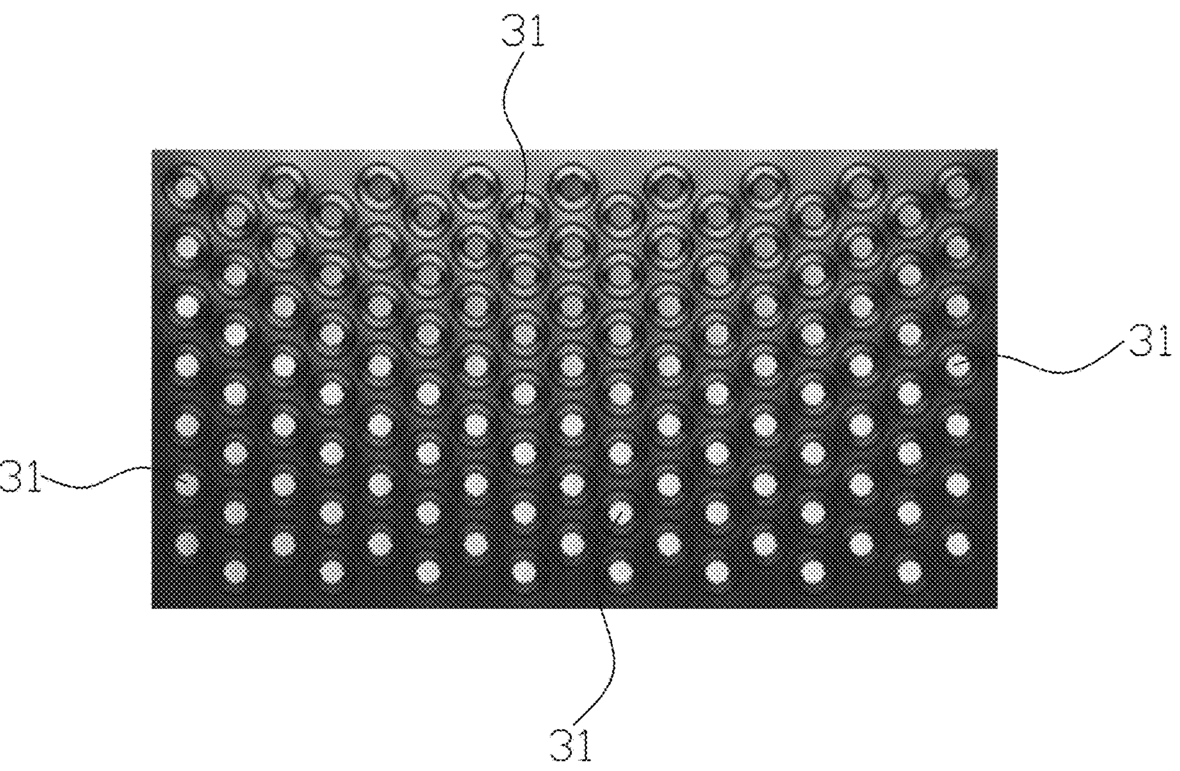
FIG. 7 shows a schematic diagram of a magnetic field distribution of a coil with the magnetic conductor according to an embodiment of the present application.
Figure 8:
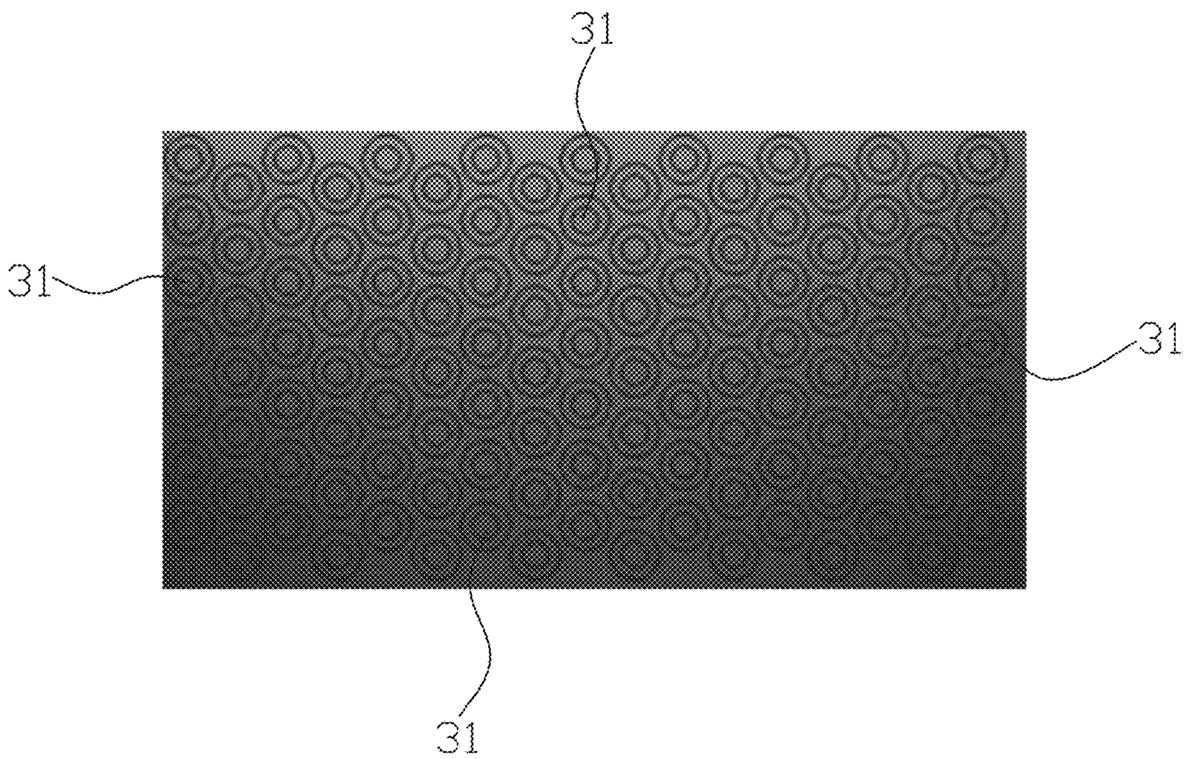
FIG. 8 shows a schematic diagram of the magnetic field distribution of the coil without the magnetic conductor according to an embodiment of the present application.

In order to further understand the effect of the coil 3 fixed with the magnetic conductor 5 and the coil 3 not provided with the magnetic conductor 5 on the magnitude of the magnetic field strength, a simulation analysis was also carried out. As shown in FIG. 7, the inner layer of the wires 31 in the coil 3 is provided with the magnetic conductor 5, and the outer layer of the wires 31 is made of a high-conductivity material. As shown in FIG. 8, the inner layer and the outer layer of the coil 3 are both made of high-conductivity materials. As shown in FIG. 8 and compared FIG. 7 with FIG. 8, the presence of the magnetic conductor 5 within the coil 3 can play a role in aggregating the magnetic field, so that the strength of the magnetic field around the wires 31 is enhanced, thereby enhancing the driving force generated when the coil 3 is energized.

Described above are only some embodiments of the present application, and it should be noted herein that improvements may be made by those of ordinary skill in the art without departing from the inventive conception of the present application, but all of these fall within the protection scope of the present application.

What is claimed is:

1. A vibration motor, comprising:

a casing having an accommodating space; and a stator assembly and a vibrator assembly accommodated in the accommodating space;

wherein one of the stator assembly and the vibrator assembly comprises a magnetic steel, and the other comprises a coil arranged in correspondence with the magnetic steel; wherein the coil interacts with the magnetic steel to provide a driving force for the vibrator assembly, and the coil is wound from wires; wherein the vibration motor further comprises a magnetic conductor arranged in a magnetic field of the magnetic steel; the magnetic conductor is made of magnet-conducting material, and the coil comprises a plurality of layers of wires stacked in a thickness direction of the coil, and the magnetic conductor is provided between two adjacent layers of the wires, and the magnetic conductor is fixed by extrusion between two adjacent turns of the wires of the coil or by adhesive bonding, and wherein when the magnetic conductor is fixed by extrusion between two adjacent turns of wires of the coil, the magnetic conductor is in the form of a column and two adjacent turns of wires of the coil in the same layer are arranged with different heights; when the magnetic conductor is fixed by adhesive bonding, the magnetic conductor is in the form of particles.

2. The vibration motor of claim 1, wherein a volume of the magnetic conductor accounts for 1% to 95% of a volume of the coil.

3. The vibration motor of claim 1, wherein the magnet-conducting material comprises at least one of pure iron, mild steel, iron-nickel alloy, iron-cobalt alloy, copper, and aluminum.

4. The vibration motor of claim 1, wherein the vibrator assembly further comprises an iron core supporting the coil, and the wires are wrapped around the iron core to form the coil.

5. The vibration motor of claim 1, wherein each of the wires comprises an electric conductor and an insulating layer wrapped around an outer side of the electric conductor, and the magnetic conductor is separated from the electric conductor by the insulating layer.

6. The vibration motor of claim 4, wherein when the magnetic conductor is fixed by extrusion between two adjacent turns of wires of the coil, the magnetic conductor is provided in the innermost layer of the coil.

7. The vibration motor of claim 1, wherein the magnetic conductor is fixed by adhesive bonding to both the innermost and outermost layers of the coil.

* * * * *